United States Patent [19]

Bhattacharyya et al.

[11] Patent Number: 5,068,297

[45] Date of Patent: Nov. 26, 1991

[54] HYDROPHOBIC CATIONIC TERPOLYMERS FROM ACRYLAMIDE, UNSATURATED QUATERNARY SALT AND VINYL ACETATE

[75] Inventors: Bhupati R. Bhattacharyya, Downers Grove; Michael R. St. John, Chicago, both of Ill.

[73] Assignee: Nalco Chemical Company, Naperville, Ill.

[21] Appl. No.: 427,454

[22] Filed: Oct. 26, 1989

[51] Int. Cl.$^5$ .......................................... C08F 220/56
[52] U.S. Cl. ................................ 526/287; 526/292.2; 526/307.3
[58] Field of Search ................... 526/287, 292.2, 307.3

[56] References Cited

U.S. PATENT DOCUMENTS 4,190,717  2/1980  Suzuki ................................. 526/62
4,857,621  8/1989  Ball ................................. 526/307.3

Primary Examiner—Christopher Henderson
Attorney, Agent, or Firm—Wallenstein, Wagner & Hattis, Ltd.

[57] ABSTRACT

Hydrophobic cationic terpolymers of monomers of (a) acrylamide and/or methacrylamide, (b) dimethylaminoethylmethacrylate methyl chloride and/or dimethylaminoethylmethacrylate methyl sulfate, and (c) vinyl acetate; water-in-oil and oil-in-water emulsions containing said terpolymers; and dewatering of wastes and sludges utilizing said oil-in-water emulsions in which the terpolymers are present essentially in the aqueous phase.

10 Claims, No Drawings ced 5,068,297

HYDROPHOBIC CATIONIC TERPOLYMERS FROM ACRYLAMIDE, UNSATURATED QUATERNARY SALT AND VINYL ACETATE

DESCRIPTION

1. Technical Field

The present invention relates to novel apolar or hydrophobic (hereafter "hydrophobic") terpolymers and emulsions containing said terpolymers, and to the dewatering of wastes and sludges utilizing said terpolymers.

2. Background Prior Art

It has long been known to the art to utilize polymers of various types for the dewatering of wastes and sludges. Numerous patents and other publications disclose particular polymers, and the preparation thereof, for use in such dewatering. Illustrative thereof is U.S. Pat. No. 4,191,645, in which cationic copolymers for such usage are disclosed to have been prepared from a nonionic monomer, for instance, acrylamide, and a cationic monomer, for instance, trimethylammoniumethylacrylate methyl sulfate (TMAEM.MSQ). The patent also describes prior known processes for preparing such cationic copolymers by dissolving the totality of the selected nonionic and cationic monomers in water, emulsifying the monomer solution in a hydrocarbon oil to form a water-in-oil emulsion composition, then effecting monomer copolymerization in the dispersed aqueous phase of said emulsion composition to obtain the desired degree of polymerization, and then inverting said emulsion in added water in conjunction with the addition of an inverting surfactant to produce an oil-in-water emulsion whereby to release the previously produced cationic copolymer to the continuous aqueous phase of the emulsion composition. The resulting emulsion composition is then admixed with wastes or sludges at selected dosage levels to effect dewatering of such wastes or sludges. That part of the foregoing type of process in which the water-in-oil emulsion containing the cationic copolymer is produced is hereafter referred to as the batch process.

The aforesaid patent also discloses what the patent states constitutes an improvement over such, and other, prior known processes for dewatering sewage sludges, which improvement involves utilizing as the dewatering copolymer a predetermined formulation of a cationic copolymer to be formed from (a) a major quantity of the nonionic monomer and (b) a minor quantity of the cationic monomer of greater reactivity than that of the nonionic monomer, (1) preparing an aqueous solution of the total quantity of the nonionic monomer and up to 95 mole percent of the total quantity of said cationic monomer to be employed by said predetermined copolymer formulation, thus providing a withheld portion of said cationic monomer; (2) emulsifying said aqueous solution in a hydrocarbon oil to provide a water-in-oil emulsion; (3) initiating the polymerization reaction; and (4) continuing the polymerization reaction while incrementally adding thereto said withheld portion of said cationic monomer until substantially all of the nonionic monomer and cationic monomer react to produce said cationic copolymer. The resulting water-in-oil emulsion is then inverted to produce an oil-in-water emulsion and said inverted emulsion is admixed with a sewage sludge whereby water is removed from the thus-treated sludge. That part of the foregoing type of process in which the water-in-oil emulsion containing the cationic copolymer is produced is hereafter referred to as the semi-batch process.

SUMMARY OF THE INVENTION

The present invention is directed to novel hydrophobic cationic terpolymers and to emulsions containing said terpolymers and the preparation thereof, as well as the use of said terpolymers or emulsions for dewatering wastes and sludges; and wherein said hydrophobic cationic terpolymers are derived or result from the polymerization of (a) at least one monomer selected from the group consisting of acrylamide and methacrylamide, (b) at least one monomer selected from the group consisting of dimethylaminoethylmethacrylate methyl chloride (DMAEM.MCQ) and dimethylaminoethylmethylacrylate methyl sulfate (DMAEM.MSQ), and (c)a vinyl acetate monomer.

DETAILED DESCRIPTION OF THE INVENTION

In the preparation of the novel hydrophobic cationic terpolymers of the present invention, the mole % of the above-stated (a), (b) and (c) monomers utilized fall within the range of about 4 to about 85 for the (a) monomer; about 10 to about 80 for the (b) monomer; and about 5 to about 26 for the (c) monomer. A preferred mole % range is about 30 to about 80 for the (a) monomer, about 15 to about 50 for the (b) monomer, and about 8 to about 20 for the (c) monomer. The most preferred and particularly advantageous mole % range, in generally most cases, is about 50 to about 70 for the (a) monomer, about 20 to about 35 for the (b) monomer, and about 10 to about 16 for the (c) monomer.

It has been found, pursuant to the present invention, that hydrophobic cationic terpolymers, generally speaking, possess improved properties in the dewatering of wastes and sludges in relation to various polymers and copolymers which have heretofore been used or recommended for use for such dewatering. This may be evaluated from the standpoint of measuring the filtration rates of the particular dewatering terpolymers of the present invention in relation to heretofore known polymers or copolymers, at the same given dosage rates thereof; or, alternatively, determining differences in the dosage rates of the particular dewatering terpolymers of the present invention in relation to heretofore known polymers or copolymers to achieve essentially equal filtration rates. Data with respect to comparative dewatering tests run on certain municipal sludges using illustrative hydrophobic cationic terpolymers compositions of the present invention and a prior known type of dewatering copolymer are described below.

Initially, however, Examples are given of the preparation of the novel hydrophobic cationic terpolymers and emulsions containing said terpolymers, pursuant to the present invention. While the terpolymers of the present invention can be produced via batch process, it has been found that it is generally advantageous to produce them via semi-batch processes because, generally speaking, the semi-batch produced terpolymers of the present invention are superior, usually appreciably or substantially superior, to the batch-produced terpolymers for dewatering sludges. Without regard to what the particular reason or reasons may be why this has been found to be so, and independently of what such reason or reasons may actually be, it is believed that this is due to a more random orientation resulting from the semi-batch process affording a better charge distribution within the molecules of the terpolymers. In the following Examples, illustrative Examples 1-6 show the preparation of illustrative terpolymers of the present invention by a semi-batch process, and emulsions containing said terpolymers; and illustrative Example 7 shows the preparation of a terpolymer by a batch process and emulsions containing said terpolymer.

It is to be understood that these Examples are given by way of illustration only and not by way of limitation as other hydrophobic cationic terpolymers and emulsions containing the same, falling within the scope of the present invention, can readily be prepared in light of the teachings and guiding principles disclosed herein. All temperatures are in °C.

EXAMPLE 1

85 Mole % Acrylamide
10 Mole % DMAEM.MCQ
5 Mole % Vinyl Acetate
% Active = 35

Monomer Phase

| Ingredients | Wt. % |
|---|---|
| Acrylamide (42.7% Solution in H$_2$O) | 57.92 |
| DMAEM.MCQ (77.1% Solution in H$_2$O) | 3.00 |
| Vinyl Acetate | 1.76 |
| Distilled Water | 0.71 |
| Adipic Acid | 1.50 |
| "VERSENE" (ethylenediamine tetraacetic acid, sodium salt) | 0.01 |

Oil Phase

| Ingredients | |
|---|---|
| "LOPS" (low odor paraffine solvent) | 25.00 |
| "SPAN" 80 (sorbitan monooleate) | 1.50 |
| "TWEEN" 61 (PEO(4) sorbitan monostearate) | 0.50 |
| "VAZO" 64 (2,2'-azobis isobutyronitrile) | 0.06 |

The "SPAN" 80 and the "TWEEN" 61 are dissolved in the "LOPS", using moderate heat, for instance about 40°-50°, while stirring, and the resulting oil phase solution is placed in a 2-liter glass reactor fitted with a stirrer, thermometer and nitrogen purge. The acrylamide, DMAEM.MCQ and vinyl acetate are added to and mixed with the water to form a solution to which the adipic acid and the "VERSENE" are added while stirring until dissolution is complete or essentially complete. The resulting monomer phase solution is added to the oil phase solution with rapid agitation, the emulsion which forms is purged with nitrogen and heated to about 45°. After about ½ hour the "VAZO" 64 is added, with stirring, to initiate the polymerization. Approximately ½ hour after such initiation, the withheld 8.04 wt. % of the DMAEM.MCQ (77.1% concentration) monomer solution is gradually added or pumped into the reaction mixture, desirably at a substantially constant rate, during a total period of about 4 hours. The reaction mixture is then post-heated about 65° for about 1 hour.

The resulting water-in-oil emulsion is inverted by adding thereto and admixing therewith about equal parts by wt. of an approximately 1 to 4%, preferably about a 2%, water solution of "TRITON" X-114 (an ethoxylated alkylphenol surfactant). Reduced specific viscosity (RSV)/Intrinsic viscosity (IV)/Huggins Constant (HC) = 17.2/14.3/0.421. The terpolymer may readily be recovered from the aqueous phase, but it is unnecessary to do so since the inverted emulsion is conveniently utilized as such for addition, in the selected dosages, of the terpolymer to the wastes or sludges to be dewatered.

The following additional Examples 2-6 are set forth below to which the foregoing procedure is applicable. Example 7 shows the preparation of an illustrative terpolymer of the present invention by the batch method. In all of these additional Examples, the water-in-oil emulsion which is produced is inverted in the manner shown in Example 1 to the corresponding oil-in-water emulsion.

EXAMPLE 2

75 Mole % Acrylamide
20 Mole % DMAEM.MCQ
5 Mole % Vinyl Acetate
% Active = 35

Monomer Phase

| Ingredients | Wt. % |
|---|---|
| Acrylamide (42.7% Solution in H$_2$O) | 44.07 |
| DMAEM.MCQ (77% Solution in H$_2$O) | 4.13 |
| Vinyl Acetate | 1.52 |
| Distilled Water | 6.75 |
| Adipic Acid | 1.52 |
| "VERSENE" | 0.01 |

Oil Phase

| Ingredients | |
|---|---|
| "LOPS" | 25.00 |
| "SPAN" 80 | 1.50 |
| "TWEEN" 61 | 0.50 |
| "VAZO" 64 | 0.06 |

The withheld DMAEM.MCQ (77% concentration) monomer solution comprises 14.94 wt. % RSV/IV/HC=15.8/12.7/0.419.

EXAMPLE 3

70 Mole % Acrylamide
20 Mole % DMAEM.MCQ
10 Mole % Vinyl Acetate
% Active = 35

Monomer Phase

| Ingredients | Wt. % |
|---|---|
| Acrylamide (42.7% Solution in H$_2$O) | 40.82 |
| DMAEM.MCQ (77% Solution in H$_2$O) | 4.125 |
| Vinyl Acetate | 3.02 |
| Distilled Water | 8.605 |
| Adipic Acid | 1.50 |
| "VERSENE" | 0.01 |

Oil Phase

| Ingredients | |
|---|---|
| "LOPS" | 25.00 |
| "SPAN" 80 | 1.50 |
| "TWEEN" 61 | 0.50 |
| "VAZO" 64 | 0.06 |

The withheld DMAEM.MCQ (77% concentration) monomer solution comprises 14.86% by wt. RSV/IV/HC=14.7/11.4/0.563.

EXAMPLE 4

| | |
|---|---|
| 55 Mole % | Acrylamide |
| 34 Mole % | DMAEM.MCQ |
| 11 Mole % | Vinyl Acetate |
| % Active = 35 | |

Monomer Phase

| Ingredients | Wt. % |
|---|---|
| Acrylamide (47.6% Solution in H₂O) | 24.12 |
| DMAEM.MCQ (75% Solution in H₂O) | 8.13 |
| Vinyl Acetate | 2.78 |
| Distilled Water | 16.88 |
| Adipic Acid | 1.50 |
| "VERSENE" | 0.01 |

Oil Phase

| Ingredients | |
|---|---|
| "LOPS" | 25.00 |
| "SPAN" 80 | 1.50 |
| "TWEEN" 61 | 0.50 |
| "VAZO" 64 | 0.06 |

The withheld DMAEM.MCQ (75% concentration) monomer solution comprises 19.52 wt. RSV/IC/HC=10.5/8.75/0.45.

EXAMPLE 5

| | |
|---|---|
| 50 Mole % | Acrylamide |
| 34 Mole % | DMAEM.MCQ |
| 16 Mole % | Vinyl Acetate |
| % Active = 35 | |

Monomer Phase

| Ingredients | Wt. % |
|---|---|
| Acrylamide (47.6% Solution in H₂O) | 21.79 |
| DMAEM.MCQ (75% Solution in H₂O) | 8.13 |
| Vinyl Acetate | 4.02 |
| Distilled Water | 18.14 |
| Adipic Acid | 1.50 |
| "VERSENE" | 0.01 |

Oil Phase

| Ingredients | |
|---|---|
| "LOPS" | 25.00 |
| "SPAN" 80 | 1.50 |
| "TWEEN" 61 | 0.50 |
| "VAZO" 64 | 0.06 |

The withheld DMAEM.MCQ (75% concentration) monomer solution comprises 19.35 wt. % RSV/IV/HC=9.52/8.20/0.437.

EXAMPLE 6

| | |
|---|---|
| 55 Mole % | Acrylamide |
| 40 Mole % | DMAEM.MCQ |
| 5 Mole % | Vinyl Acetate |
| % Active = 35 | |

Monomer Phase

| Ingredients | Wt. % |
|---|---|
| Acrylamide (42.7% Solution in H₂O) | 15.86 |
| DMAEM.MCQ (77% Solution in H₂O) | 15.37 |
| Vinyl Acetate | 1.03 |
| Distilled Water | 19.20 |
| Adipic Acid | 1.50 |
| "VERSENE" | 0.01 |

Oil Phase

| Ingredients | |
|---|---|
| "LOPS" | 25.00 |
| "SPAN" 80 | 1.50 |
| "TWEEN" 61 | 0.50 |
| "VAZO" 64 | 0.06 |

The withheld DMAEM.MCQ (77% concentration) monomer solution comprises 19.97 wt % RSV/IC/HC=11/70/9.50/0.540.

EXAMPLE 7

| | |
|---|---|
| 60 Mole % | Acrylamide |
| 34 Mole % | DMAEM.MCQ |
| 6 Mole % | Vinyl Acetate |

| INGREDIENTS | Wt. % |
|---|---|
| Acrylamide (46.8% Solution in H₂O) | 26.93 |
| DMAEM.MCQ (75% Solution in H₂O) | 27.83 |
| Vinyl Acetate | 1.53 |
| Water | 15.14 |
| Adipic Acid | 1.50 |
| "VERSENE" | 0.02 |
| "LOPS" | 25.00 |
| "SPAN" 80 | 1.50 |
| "TWEEN" 61 | 0.50 |
| "VAZO" 64 | 0.06 |

The "SPAN" 80 and the "TWEEN" 61 are dissolved in the "LOPS", using moderate heat, for instance about 40°-50°, while stirring, and the resulting oil phase solution is placed in a 2-liter glass reactor fitted with a stirrer, thermometer and nitrogen purge. The acrylamide, DMAEM.MCQ and vinyl acetate are added to and mixed with the water to form a solution to which the adipic acid and the "VERSENE" are added, while stirring, until dissolution is complete or essentially complete. The resulting monomer phase solution is added to the "LOPS" oil phase solution with rapid agitation, the emulsion which forms is purged with nitrogen and heated to about 45°. After about ½ hour the "VAZO" 64 is added, with stirring, and the reaction is allowed to proceed for about 4 hours at about 45°. The reaction mixture is then post-heated at about 65° for about 1 hour.

Test Data Regarding Dewatering Using Illustrative Hydrophobic Cationic Terpolymers of Acrylamide (AcAm)/DMAEM.MCQ/Vinyl Acetate (VINAC) vs. Illustrative Copolymer of AcAm/DMAEM.MCO The following dewatering activity data are presented for illustrative hydrophobic cationic terpolymers of the present invention, utilizing, in the preparation thereof, acrylamide, DMAEM.MCQ and vinyl acetate in the mole % proportions stated in the following TABLE I, the terpolymers of Nos. 227, 228, 248 and 251 corresponding to the above EXAMPLE Nos. 2, 3, 4 and 5 respectively. Additional terpolymers made in accordance with the present invention are also shown. Also set forth in TABLE I under copolymer Nos. 14, 208, 210 and 222 are copolymers of acrylamide and DMAEM.MCQ which were used as blanks and as being generally or reasonably representative of known dewatering polymers for comparative test purposes. Intrinsic viscosity measurements are also shown.

TABLE I

| Copolymer Terpolymer | Mole % AcAm | Mole % DMAEM.MCQ | Mole % VINAC | IV | Synthesis Semi-Batch |
|---|---|---|---|---|---|
| 13 | 56 | 34 | 10 | 10 | Batch |
| 14 | 66 | 34 | 0 | 10 | Batch |
| 208 | 66 | 34 | 0 | 11 | Semi-Batch |
| 210 | 85 | 15 | 0 | 17 | Semi-Batch |
| 220 | 75 | 20 | 5 | 11.9 | Semi-Batch |
| 214 | 75 | 20 | 5 | 17.2 | Semi-Batch |
| 222 | 80 | 20 | 0 | 15.7 | Semi-Batch |
| 227 | 75 | 20 | 5 | 15.8 | Semi-Batch |
| 228 | 70 | 20 | 10 | 14.7 | Semi-Batch |
| 248 | 55 | 34 | 11 | 8.75 | Semi-Batch |
| 251 | 50 | 34 | 16 | 8.2 | Semi-Batch |
| 252 | 50 | 34 | 16 | 6.25 | Semi-Batch |
| 253 | 55 | 34 | 11 | 8.5 | Semi-Batch |

AcAm = Acrylamide
DMAEM.MCQ = Dimethylaminoethylmethacrylate Methyl Chloride
VINAC = Vinyl Acetate
IV = Intrinsic Viscosity Activity testing was carried out on a number of sludges which were collected from a number of sources. They included different types of sludges among which were municipal sludges from different waste treatment plants from various municipalities in the State of Illinois, specifically anaerobic sludges from the cities of Stickney and Aurora, Ill.; primary/secondary blend sludges from Carpentersville, Ill.; and from sludges obtained from pulp and paper mills in Neekosa and in Green Bay, Wis. Dewatering criteria or performances were evaluated or based upon the free drainage of conditioned sludge after 10 seconds, or, in other words, by the amount of filtrate obtained after 10 seconds (i.e., a filtration rate) by gravity filtration of the conditioned sludge through twin belt press filter fabric at fixed polymer doses. A performance index (PI) was determined by taking the ratio of the filtrate volume obtained with the terpolymers to the filtrate volume obtained with copolymers. Thus, PI values greater than 1 indicate increased filtration rates, and less than 1 decreased filtration rates.

The following TABLES II through V present the PI data for Stickney, Aurora and Carpentersville municipal sludges and TABLES VI and VII data for the paper mill sludges from Nekoosa and Green Bay. The ppm dosages of the terpolymers are based upon the weight concentration in the conditioned sludges.

In the TABLES, PI's are given for a range of the terpolymer and the copolymer dosage which correspond to values needed for at least partly acceptable dewatering to occur. The particular dose required for optimal results generally varies according to the equipment being used and the particular needs of the waste treatment plant. For the Stickney and Aurora sludges, dewatering activity of the terpolymers at lower dosages is about equal to or somewhat better than the copolymer. At higher dosages, the terpolymers perform advantageously. With respect to the Carpentersville sludges, there is a generally consistent improvement over the entire dosage range of the terpolymers over the copolymers.

In regard to the paper mill sludges there was essentially no improvement by the terpolymers over the copolymers in the filtration rate of the Nekoosa sludge, but a large improvement in the filtration rate of the Green Bay sludge by the terpolymers over the copolymers.

Based on the test data, it may be generally stated that the terpolymers of the present invention resulted in improvement, and, in certain sludges, appreciable improvement in dewatering activity in some or various sludges over copolymers, and in generally equivalent activity to the copolymers in the case of other sludges.

TABLE II

PI (with respect to Copolymer 208) for Terpolymers Added to Stickney Anaerobic Sludge at Various Fixed Terpolymer Doses*

| | PI @ | | | |
|---|---|---|---|---|
| Terpolymer | 90 ppm | 112 ppm | 134 ppm | 157 ppm |
| 248 | 0.95 | 1.07 | 1.03 | 1.08 |
| 251 | 1.14 | 1.09 | 1.12 | 1.11 |

*Terpolymer concentration in conditioned sludge

TABLE III

PI (with respect to Copolymer 208) for
Terpolymers Added to Aurora Anaerobic Sludge #1
at Various Fixed Terpolymer Doses*

| | PI @ | | | |
|---|---|---|---|---|
| Terpolymer | 67 ppm | 90 ppm | 112 ppm | 134 ppm |
| 248 | 0.84 | 1.02 | 1.03 | 1.11 |
| 251 | 0.86 | 0.98 | 1.01 | 1.05 |
| 252 | 0.80 | 0.97 | 1.01 | 1.06 |
| 253 | 0.96 | 0.96 | 1.03 | 1.03 |

*Terpolymer concentration in conditioned sludge

TABLE IV

PI (with respect to Copolymer 14) for
Terpolymers in Aurora Anaerobic Sludge #2
at Various Fixed Terpolymer Doses*

| | PI @ | | | |
|---|---|---|---|---|
| Terpolymer | 100 ppm | 120 ppm | 140 ppm | 160 ppm |
| 13 | 1.03 | 1.03 | 0.97 | 1.14 |

TABLE V

PI (with respect to Copolymer 208) for
Terpolymers in Carpentersville Primary/Secondary
Blend Sludge at Various Fixed Terpolymer Doses*

| | PI @ | | |
|---|---|---|---|
| Polymer | 28 ppm | 56 ppm | 98 ppm |
| 251 | 1.04 | 1.02 | 1.02 |
| 248 | 1.06 | 1.03 | 1.06 |

TABLE VI

PI (with respect to Copolymer 222) for
Terpolymers in Nekoosa Secondary
Sludge at Various Fixed Polymer Doses*

| | PI @ | | |
|---|---|---|---|
| Polymer | 180 ppm | 200 ppm | 240 ppm |
| 214 | 0.61 | 0.81 | 1.01 |

TABLE VII

PI (with respect to Copolymer 210) for Terpolymers
in Green Bay Primary/Secondary Blend
Sludge at Various Fixed Polymer Doses*

| | PI @ | | |
|---|---|---|---|
| Terpolymer | 50 ppm | 67 ppm | 84 ppm |
| 227 | 1.63 | 1.50 | 1.04 |
| 228 | 1.42 | 1.59 | 1.00 |

The terpolymers of the present invention which result from the use of about 11 to about 16 mole % of vinyl acetate are, generally, most effective. At mole % usage of vinyl acetate below about 5 in the preparation of the terpolymers, there does not appear to be any significant dewatering improvement over the use of known polymers or copolymers. At mole % usage of vinyl acetate above about 26 in the preparation of the terpolymers, dewatering activity tends to decline in relation to the use of known polymers or copolymers.

The terpolymers of EXAMPLES 4 and 5, the emulsions prepared therefrom and the use of the oil-in-water emulsions for the dewatering of wastes and sludges are considered, as presently aware, to constitute the best embodiments of the present invention. As indicated above, however, it should be understood that those terpolymers of the present invention which are particularly advantageous in the dewatering of certain wastes or sludges are not necessarily similarly effective when applied to the dewatering of various other particular wastes or sludges. Thus, by way of illustration, reasonably generally, it may be noted that, in the dewatering of wastes or sludges from pulp and paper mills, the terpolymers of the present invention in which the vinyl acetate is at the lower end of ranges set forth above are more effective; whereas, where the wastes or sludges are from municipality sources, the terpolymers continuing the higher end of ranges of vinyl acetate are more effective. Thus, terpolymers such as shown in Examples 1 and 2; and, also, where the vinyl acetate is used in the range of 5 to 10%, in conjunction with acrylamide in the range of 40 to 70%, balance DMAEM.MCQ and/or MSQ; or 6 to 8% of the vinyl acetate and 50 to 65% of the acrylamide, balance the DMAEM.MCQ and/or MSQ, are most advantageous, generally speaking, for use in the dewatering of sludges from paper or pulp mill operations. Overall, what has been set forth above as being considered as the best embodiments of the present invention is, generally speaking, correct.

The Emulsions of the Hydrophobic Cationic Terpolymers

The emulsions of the hydrophobic cationic terpolymers of the present invention, as initially produced as described above, are emulsions of the water-in-oil type which are then inverted to form oil-in-water type emulsions for use in the dewatering of wastes and sludges.

The water-in-oil emulsions of the hydrophobic cationic terpolymers of the present invention contain four essential components which, and their weight percentages in the emulsions, are as follows:

A. Terpolymer, from about 5 to about 60%, preferably from about 20 to about 40%, and most preferably from about 25 to about 35%.

B. Water, from about 20 to about 90%, preferably from about 25 to about 70%, and most preferably from about 30 to about 55%.

C. Water-immiscible liquid, from about 5 to about 75%, preferably from about 10 to about 40%, and most preferably from about 20 to about 30%.

D. Water-in-oil emulsifier, from about 0.1 to about 20%, preferably from about 1 to 15%, and most preferably from about 1.2 to about 10%.

The water-in-oil emulsions of the terpolymers may also be characterized with respect to the aqueous phase of the emulsions. The aqueous phase may generally be defined as the sum of the terpolymer and the water present in the emulsion. So viewed, the aqueous phase of the water-in-oil emulsions generally constitutes from about 25 to about 95% by weight of the emulsions, preferably from about 35 to about 60%, and most preferably from about 40 to about 50%.

The emulsions may also be characterized in relation to the water/oil ratios, namely, the ratio of the weight of water divided by the weight of the water-immiscible liquid present in the emulsions. Generally, the water-in-oil emulsions of this invention have a water/oil ratio of from about 0.25 to about 18, preferably from about 0.5 to about 10, and most preferably from about 1 to about 3.

Physical Properties of The Water-In-Oil Emulsions

The water-in-oil emulsions of the hydrophobic cationic terpolymers are quite stable when the particle sizes of the terpolymers are in the range of about 0.01 to about 5 microns. The preferred particle sizes are generally in the range of from about 0.5 microns to about 3 microns, most preferred particle sizes being generally in the range of from about 0.2 to about 2 microns.

The emulsions generally have a viscosity in the range of from about 50 to about 1000 cps. However, the viscosity of these emulsions can be affected greatly by increasing or decreasing the terpolymer content, oil content, or water content as well as the choice of a suitable water-in-oil emulsifier.

The Preparation of the Water-In-Oil Emulsions

A very satisfactory procedure has been described above for the preparation of the water-in-oil emulsions of the hydrophobic cationic terpolymers. Various other procedures which are generally known to the art for the preparation of water-in-oil emulsions of polymers or copolymers derived from monomers can be utilized as shown, for instance, in U.S. Pat. No. 3,284,393; Re. No. 28,474; Re. No. 28,576; U.S. Pat. Nos. 3,826,771; 3,767,629 and 3,996,180, the disclosures of which are herein incorporated by reference. With respect to the present invention, after forming the water-in-oil emulsion of (1) a solution in water containing the monomers disclosed above to produce the hydrophobic cationic terpolymer, and other ingredients of conventional character, and (2) the water-immiscible liquid, in the presence of the water-in-oil emulsifier, polymerization is then carried out to produce the terpolymer in said emulsion. The polymerization is particularly advantageously carried out under free radical catalyst conditions, utilizing organic peroxides, redox type initiator systems, "VAZO" type material, for instance, "VAZO" 64, as shown above, etc. Other polymerization techniques, including those which are known to the art, can be used such as ultraviolet light, microwaves, etc.

The Water-In-Oil Emulsifiers

Generally speaking, almost any conventional water-in-oil emulsifier can be used, for instance, sorbitan monostearate, sorbitan monooleate, and the so-called low HLB materials which are all documented in the literature and are summarized in the Atlas HLB Surfactant Selector. Although the mentioned emulsifiers are used in producing water-in-oil emulsions, other surfactants may be used so long as they are capable of producing such emulsions.

U.S. Pat. No. 3,997,492 shows the use of emulsifiers generally having higher HLB values to produce stable emulsions similar in character to those discussed above. With the use of the equations present in this patent, emulsifiers having HLB values between 4 and 9 can be effectively utilized in the practice of the present invention. In addition to said patent, U.S. Pat. No. 4,024,097 discloses particular emulsifiers for producing the water-in-oil emulsions, which emulsifiers can be used to prepare the water-in-oil emulsions of the present invention. The foregiong patents, as to the disclosure of emulsifiers for producing water-in-oil emulsions, are incorporated herein by reference.

The Water-Immiscible Liquids

The water-immiscible liquids or oils which are used in preparing the emulsions of the present invention may be selected from a large group of such organic liquids which include, particularly, liquid hydrocarbons and substituted liquid hydrocarbons. A preferred group of organic liquids which can be utilized in the practice of this invention are straight-chain and branch-chain paraffinic hydrocarbon oils. Examples of these types of materials include a branch-chain isoparaffinic solvent sold under the trade designation "Isopar M" described in U.S. Pat. No. 3,642,019, and a paraffinic solvent sold by the Exxon Company, U.S.A. called "Low Odor Paraffinic Solvent", commonly designated as "LOPS". Typical specifications of this latter solvent are as follows:

| | |
|---|---|
| Specific Gravity 60'/60'F. | 0.780–0.806 |
| Color, Saybolt | +30 min. |
| Appearance, visual | Bright and Clear |
| Aniline Point, 'F., ASTM D-611 | 160 min. |
| Distillation, 'F., ASTM D-86 | |
| IBP | 365 min |
| FBP | 505 max. |
| Flash Point, 'F., TCC | 140 min. |
| Sulfur, ppm, Microcoulometer | 15 max. |

While, as stated above, paraffinic oils are the preferred materials for use in preparing the emulsions of this invention, other water-immiscible organic liquids can be utilized. These include, for instance, mineral oils, kerosenes, naphthas; and, also, aromatic solvents such as benzene, xylene and toluene, and other water-immiscible hydrocarbons. Those which have low flash points or toxic properties are generally avoided due to problems associated with their handling. The water-immiscible liquids are non-reactive or essentially non-reactive with the terpolymers.

The Inversion of the Water-In-Oil Emulsions Of The Terpolymers

The water-in-oil emulsions of the terpolymers described above can readily be inverted when added to aqueous solutions in the presence of an inverting agent or under physical stress. Upon inversion, the emulsion releases the terpolymer into the water phase in a very short period of time. This inversion technique is described in U.S. Pat. No. 3,624,019. As stated in said patent, inversion can be effected by any number of means, most conveniently by the use of a surfactant. The placement of the surfactant into the water causes the emulsion to rapidly invert and release the terpolymer in the form of an aqueous solution. When this technique is used to invert the terpolymer-containing emulsion the amount of surfactant present in the water may vary over a range of about 0.01 to about 50% based on the terpolymer. Good inversion generally occurs within the range of about 1.0 to about 10% based on the terpolymer.

The preferred surfactants utilized to cause the inversion of the water-in-oil emulsion of this invention when the emulsion is added to or admixed with water are hydrophilic and, desirably, are readily water-soluble. Illustrative hydrophilic type surfactants such as ethoxylated nonyl phenols, ethoxylated nonyl phenol formaldehyde resins, dioctyl esters of sodium sulfo-succinate and octyl phenol polyethoxy ethanols can effectively be used. Preferred surfactants are generally, nonyl phenols which have been ethoxylated with from 8 to 15 moles of ethylene oxide. A more complete list of surfactants usable to invert the emulsions is found in the aforesaid patent, the disclosure of which is incorporated herein by reference.

The Wastes and Sludges

The wastes and sludges which are treatable to effect dewatering thereof by the terpolymers or the oil-in-water inverted emulsions of the present invention are of diversified character. They comprise industrial wastes, municipal wastes such as sewage or activated sewage sludges, and biological wastes or sludges which may constitute secondary anaerobically or aerobically digested sludges. It is well recognized that particular wastes or sludges vary in their dewatering characteristics and in their contents of solids. Illustrative of such wastes or sludges are those which contain from about 1 to about 3wt. % of solids.

Dosages of Terpolymers in Dewatering

Dosages of the terpolymers are variable depending upon the particular wastes or sludges. Generally, the ranges of such dosages are from about 100 to about 400 ppm of the terpolymer (active basis) based on the weight of the wastes or sludges, preferably in the range of from about 140 to about 300.

What is claimed is:

1. A hydrophobic cationic terpolymer of (a) at least one monomer selected from the group consisting of acrylamide and methacrylamide, (b) at least one monomer selected from the group consisting of dimethylaminoethymethacrylate methyl chloride and dimethylaminoethylmethacrylate methyl sulfate, and (c) a vinyl acetate monomer, the mole % of said (a), (b), and (c) monomers being in the range of from 30 to about 85 for the (a) monomer, from about 5 to about 26 for the (c) monomer, and the balance for the (b) monomer.

2. The terpolymer of claim 1 wherein the mole % is in the range of from about 50 to about 65 for the (a) monomer, from about 6 to about 8 for the (c) monomer, and the balance for the (b) monomer.

3. The terpolymer of claim 1 wherein the mole % of the (a) monomer is in the range of from about 50 to about 70.

4. The terpolymer of claim 1 wherein the mole % of the (b) monomer is in the range of from about 15 to about 50.

5. The terpolymer of claim 1 wherein the mole % of the (b) monomer is in the range of from about 20 to about 35.

6. The terpolymer of claim 1 wherein the mole % of the (c) monomer is in the range of from about 8 to about 20.

7. The terpolymer of claim 1 wherein the mole % of the (c) monomer is in the range of from about 10 to about 16.

8. The terpolymer of claim 1 wherein the mole % is in the range of from 30 to about 80 for the (a) monomer, from about 15 to about 50 for the (b) monomer, and from about 8 to about 20 for the (c) monomer.

9. The terpolymer of claim 1 wherein the mole % is in the range of from about 50 to about 70 for the (a) monomer, from about 20 to about 35 for the (b) monomer, and from about 10 to about 16 for the (c) monomer.

10. The terpolymer of claim 1 wherein the mole % is in the range of from about 40 to about 70 for the (a) monomer, from about 5 to about 10 for the (c) monomer, and the balance for the (b) monomer.

* * * * *

UNITED STATES PATENT AND TRADEMARK OFFICE
CERTIFICATE OF CORRECTION

PATENT NO. : 5,068,297

DATED : November 26, 1991

INVENTOR(S) : BHATTACHARYYA et al.

It is certified that error appears in the above-identified patent and that said Letters Patent is hereby corrected as shown below:

Column 6, line 38, delete "11/70" and insert --11.70--.

Column 7, line 12, delete "MCO" and insert --MCQ--.

Column 10, lines 7-8, delete "contining" and insert --containing--.

Signed and Sealed this

Twenty-eighth Day of September, 1993

Attest:

BRUCE LEHMAN

Attesting Officer

Commissioner of Patents and Trademarks